United States Patent [19]

Iwanczyk

[11] Patent Number: 5,227,635
[45] Date of Patent: Jul. 13, 1993

[54] MERCURIC IODIDE X-RAY DETECTOR

[75] Inventor: Jan S. Iwanczyk, Los Angeles, Calif.

[73] Assignee: Xsirious, Inc., Marina Del Re, Calif.

[21] Appl. No.: 798,285

[22] Filed: Nov. 22, 1991

[51] Int. Cl.$^5$ .......................... G01T 1/24; H01L 31/00
[52] U.S. Cl. ........................... 250/370.12; 250/370.01; 250/336.1
[58] Field of Search ....................... 250/370.01, 370.09, 250/370.12, 336.1, 338.4

[56] References Cited

U.S. PATENT DOCUMENTS

| | | | |
|---|---|---|---|
| 3,638,022 | 1/1972 | Kozlov | 250/370.01 |
| 3,858,047 | 12/1974 | Kozlov | 250/370.01 |
| 3,916,200 | 10/1975 | Sparks, Jr. et al. | 250/370.01 X |
| 4,751,391 | 6/1988 | Eberhard et al. | 250/385.1 |
| 4,883,967 | 11/1989 | Tsutsui et al. | 250/370.01 |

Primary Examiner—Paul M. Dzierzynski
Assistant Examiner—Edward J. Glick
Attorney, Agent, or Firm—Herbert M. Shapiro

[57] ABSTRACT

Mercuric Iodide X-RAY detectors are made to exhibit high energy resolution characteristics, reduced background level in the x-ray spectra, enhanced sensitivity to low energy x-rays and significantly improved long term stability and reliability. The above improvements has been achieved through specific changes in the detector construction and passivation/encapsulation techniques. Specifically, the introduction of a guard ring structure and collimating shield improved the electric field distribution in the detector, reduced the surface leakage current, lowered effective capacitance and eliminated current injections. A special Parylene-C and Parylene-N deposition onto the detector surface insured excellent long term detector stability and reliability.

7 Claims, 1 Drawing Sheet

MERCURIC IODIDE X-RAY DETECTOR

FIELD OF THE INVENTION

This invention relates to X-RAY detectors and more particularly to Mercuric Iodide X-RAY detectors.

BACKGROUND OF THE INVENTION

Mercuric Iodide ($HgI_2$) single crystals have long been thought to have potential as a material for solid state x-ray detectors for many spectrometeric applications. But, to date have been characterized by limited reliability, low energy resolution, and low yields. Thus, they have not achieved significant commercial success.

Specifically, prior art Mercuric Iodide detectors have been characterized by a very small active areas (1-2 $mm^2$), high background levels in the x-ray spectral responses, instabilities in the detector leakage currents, limited detector life-times and reliability. All above problems of prior art detectors are related to the improper detector construction, poor surface passivation/encapsulation and poor packaging.

BRIEF DESCRIPTION OF AN ILLUSTRATIVE EMBODIMENT OF THIS INVENTION

The present invention is directed at larger area Mercuric Iodide detectors which are constructed in a special way to create proper electric field distribution in the active part of the detector, limit surface leakage currents and eliminate unwanted charge injection effects which limit the detector performance. Such devices, when properly passivated and packaged, experimentally exhibited long term stability and reliability, significantly improved energy resolution, significantly reduced background level in the spectral responses, and enhanced low energy x-ray sensitivity. In addition the present invention allows for constructing much larger active area detectors that can operate under much higher intensity x-ray beams than prior art devices.

Specifically, it has been recognized that unstable and excessive leakage currents in Mercuric Iodide X-ray detectors may significantly degrade device characteristics limiting energy resolution and resulting in failures due to the voltage breakdown. It has also been found that confinement of the exposed portion of the entrance surface of the detector to avoid generation of charge carriers by x-rays in regions of the Mercuric Iodide ($HgI_2$) with weak electric field eliminates the unwanted current injections.

The introduction of guard ring structure and collimating shield have been found to significantly improve detector performance by creating proper electric field distribution in the active part of the detector, reducing the surface leakage current, lowering effective detector capacitance, and eliminating injections.

$HgI_2$ surface passivation and device encapsulation are critical for insuring their initial performance as well as the long term stability and reliability. It was found that proper detector surface etching followed with a special Parylene-C or Parylene-N ®, trademarks of Union Carbide Corporation having generic compositions of Poly-monochloro-para xylylene and Poly-para-xylylene, respectively. deposition gave excellent results in terms of low leakage current and electronic noise figures, and long term stability of detector characteristics. Moreover the improved deposited films of Parylene-C and Parylene-N provide excellent transparency for low energy x-ray radiation.

DETAILED DESCRIPTION OF AN ILLUSTRATIVE EMBODIMENT OF THIS INVENTION

Figure 1:
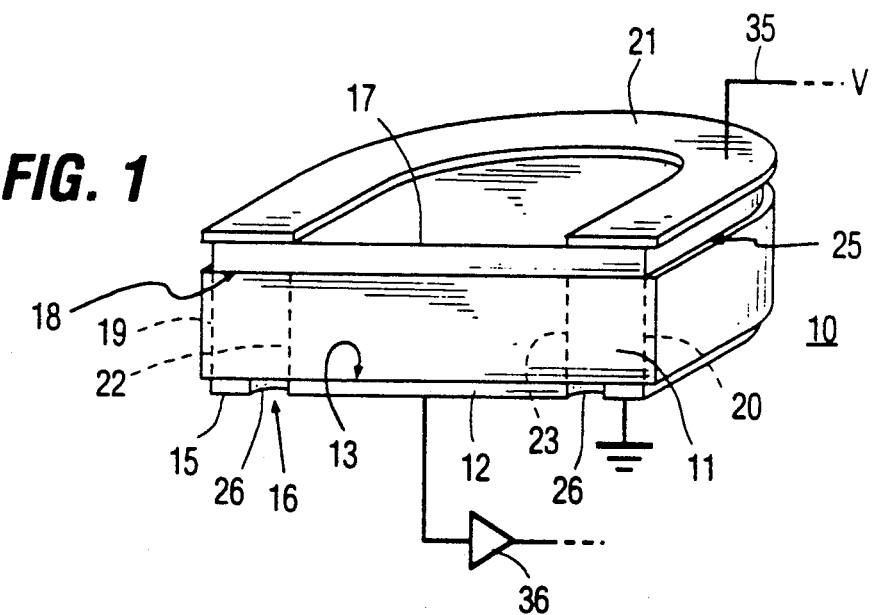
FIG. 1 is a schematic representation of a Mercuric Iodide X-RAY detector in accordance with the principles of this invention.

FIG. 1 shows a schematic cross section of a Mercuric Iodide X-RAY detector 10 in accordance with the principles of this invention. The detector comprises a crystalline, (illustratively), disc-shaped body 11 of Mercuric Iodide. The disc is, for example, one and one half centimeters in diameter and 300 to 5000 micrometer thick.

The detector includes a collection electrode 12 on the backside surface 13 of the crystal. A guard 15 ring also is formed on surface 13. The collection electrode comprises Palladium and typically is about one centimeter in diameter and 200 Angstroms where an Angstrom equals $10^{-8}$ cm thick. The guard ring typically is 200 millionths of a meter $\times 10^{-8}$ cms wide and 200 thick. The guard ring is separated from the collection electrode by about $200 \times 10^{-8}$ cms forming a space 16.

An X-RAY-transparant entrance electrode 17 is formed on the entrance surface 18 of the detector. The entrance electrode has a diameter which matches the size of the backside electrode plus the space and guard ring and has thickness of about $200 \times 10^{-8}$ cms. The diameter of the entrance electrode thus corresponds to the outside diameter of the backside guard ring 15 as indicated by imaginary vertical broken lines 19 and 20 in the figure.

A shield 21 overlies entrance electrode 17. Shield 21 is made of stainless steel or Cadmium and has a thickness of over five mils. The inside diameter of the shield is such that the shield defines an entrance surface smaller than the collection electrode. Thus, the shield extends inwardly over entrance electrode 17 beyond imaginary vertical lines 22 and 23 which correspond to the limits of collection electrode 12. The outside diameter of the shield is such that the shield extends beyond the limits of entrance electrode 17, corresponding in diameter to the limits of crystal 11. Thus, there is an overhang 25 defined by the shield about the periphery of the entrance electrode. Moreover, the shield is electrically connected to the entrance electrode.

The collection electrode is separated from its guard ring by a spacing of 200 millionths of a meter. The spacing 16 is etched and coated with a passivating film 26 to permit a high impedance to be maintained between the collection electrode and the guard ring.

Figure 2:
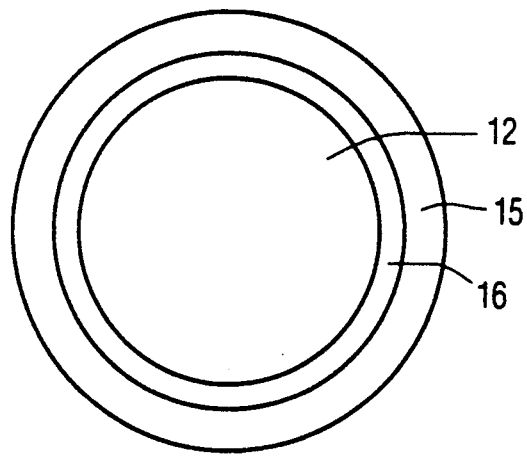
FIGS. 2 and 3 are top and bottom views of the detector of FIG. 1.
Figure 3:
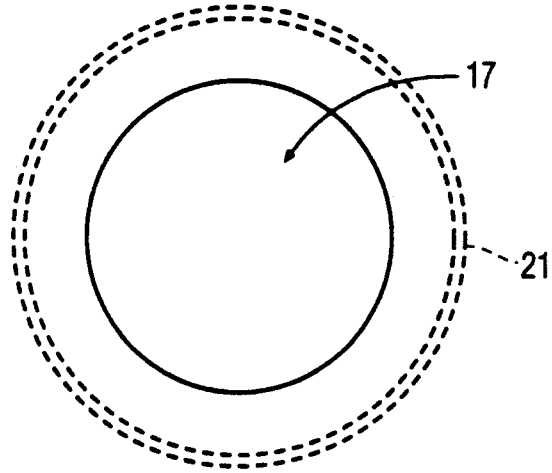

FIG. 2 shows a high impedance region (space 16) situated between guard ring 15 and collection electrode 12. FIG. 3 shows a central portion of entrance electrode 17 exposed by shield 21.

Shield 21 is of electrically-conducting material. The shield is formed as an integral part of the entrance electrode, but is opaque to X-RAYS. the entrance electrode and shield are maintained at a high negative voltage during operation as indicated at 35. An amplifier 36 is connected to collection electrode 12.

Disc 11 illustratively comprises substantially monocrystalline Mercuric Iodide extending between entrance and collection surfaces 17 and 13, respectively. The surfaces are smooth and parallel to one another.

X-RAYS pass through the portion of the entrance electrode which is exposed by the shield. The X-RAYS are absorbed by the Mercuric Iodide in a surface region close to the entrance electrode. Electron-hole pairs produced by the X-RAYS are acted upon by the electric field within the crystal. The holes are drawn to the negative potential at the entrance electrode before they have a chance to be trapped or recombine. The electrons are drawn to the collection electrode and have high probability of reaching the electrode due to the relatively good collection characteristics of Mercuric Iodide, electrons being much more mobile therein and having a long lifetime as well. Virtually all the electrons reach the collection electrode. The amplitude of the charge pulse, induced by the electrons and holes, is a measure of the energy of the incident X-RAYS. The entire device is coated with a thin layer of Parylene-N or Parylene-C (not shown) applied by a technique in which only carefully controlled amounts of material are loaded into a source boat and the ramp up temperature is also carefully controlled. This deposition process produces encapsulation layers which are relatively thin, highly transparent and free of gases. "Gas bubbles," if they occur in the films, increase probability of the occurrence of pinholes in the film. This procedure is described in the IEEE Transaction of Nuclear Science, Vol. 37. No. 6, pp. 2214–2218, December 1990. The layer of Parylene-N or Parylene-C is thin, on the order of 0.5 to 5 microns and is deposited after the surface of the detector is etched with 5–10% KI solution.

Devices in accordance with the principles of this invention exhibit x-ray fluorescence spectra with relatively narrow characteristic energy lines widths because of the low level of electronic noise exhibited by the device. Moreover devices exhibit high sensitivity to low energy x-rays and are characterized by low background levels in the x-ray spectra. For example, with respect to Nickel, three of the characteristic Ni lines (K-alpha, K-beta and L) are visible in the x-ray spectrum with an energy resolution of 182 eV (FWHM) at 849 eV. The line Ni L at 849 eV would not be visible with prior art devices.

What is claimed is:

1. An X-RAY detector comprising a body of Mercuric Iodide material having first and second large area surfaces and an edge surface, said first surface having thereon a first electrode transparent to X-RAYS, said electrode covering essentially said entire first surface, said electrode having thereon an X-RAY opaque shield, said shield having a geometry to leave exposed at least a central area of said electrode, wherein said shield extends to the edge of said surface in a manner to shield said edge from X-RAYS and wherein said second surface includes a second electrode of a geometry corresponding to the exposed portion of said first electrode, said second electrode having an edge which lies under the projection of said shield on said second surface, said second surface also including a guard ring separated from said second electrode by a space.

2. A detector as set forth in claim 1 wherein said space includes a passivating layer.

3. A detector as set forth in claim 1 wherein said exposed portion of said first electrode is circular in geometry.

4. A detector as set forth in claim 3 wherein said shield is annular in geometry, said body of Mercuric Iodide being disc-shaped and having a first radial dimension, said first electrode also having a disc shape and a second radial dimension of less than that of said body such that said shield overhangs said first electrode.

5. A detector as set forth in claim 4 wherein said second electrode is disc-shaped having a center aligned with that of said first electrode and having a radial dimension larger than that of the exposed portion of said first electrode.

6. A detector as set forth in claim 5 wherein the entire detector is coated with a relatively thin, gas free layer of Poly-monochloro-para-xylene.

7. A detector as set forth in claim 5 wherein the entire detector is coated with a relativity thin, gas free layer of Poly-para-xylylene.

* * * * *